Aug. 27, 1957 E. W. HEWSON ET AL 2,804,219
BALED HAY LOADER ATTACHMENT FOR VEHICLES
Filed Dec. 27, 1954 2 Sheets-Sheet 1
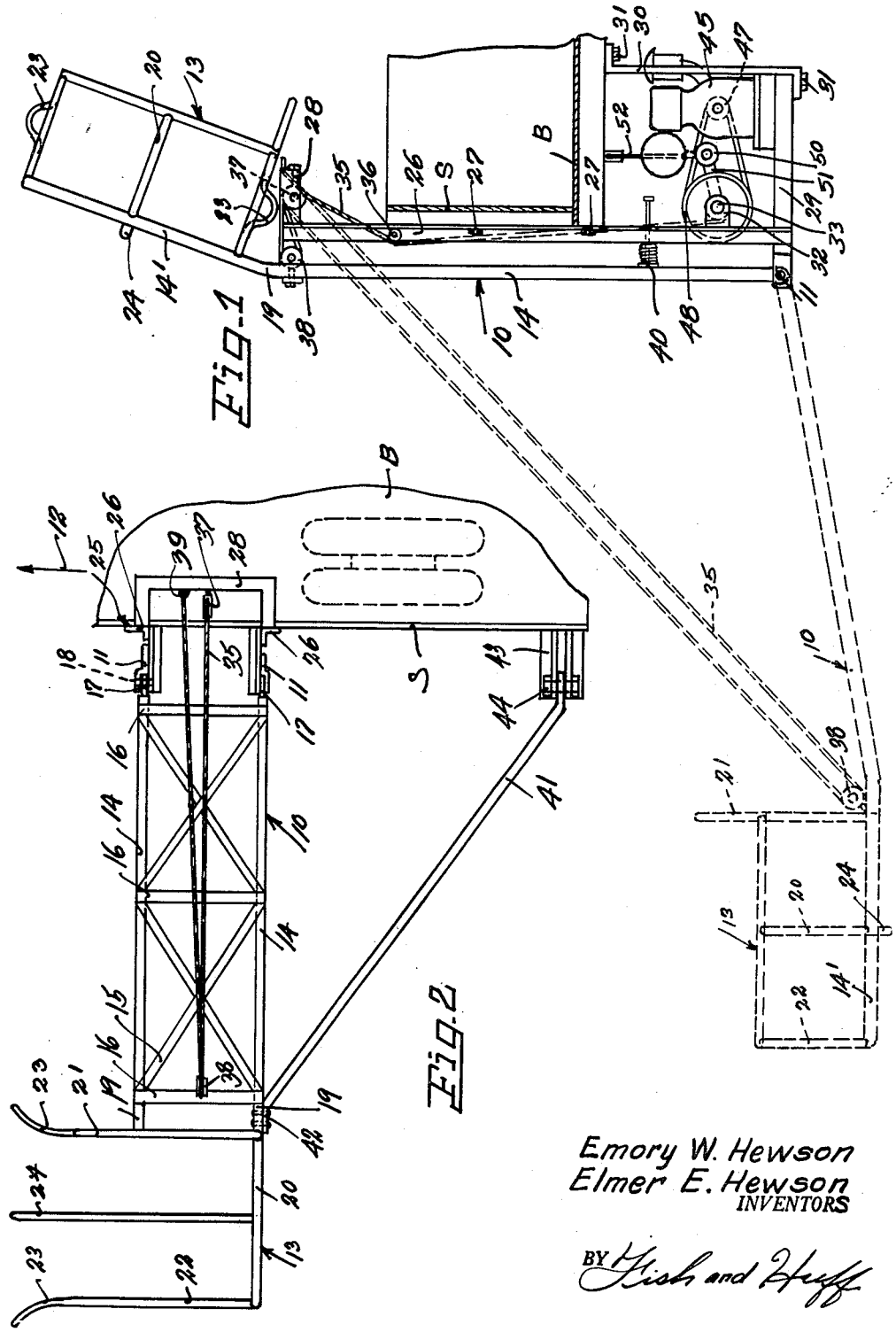
Emory W. Hewson
Elmer E. Hewson
INVENTORS Aug. 27, 1957  E. W. HEWSON ET AL  2,804,219
BALED HAY LOADER ATTACHMENT FOR VEHICLES
Filed Dec. 27, 1954  2 Sheets-Sheet 2
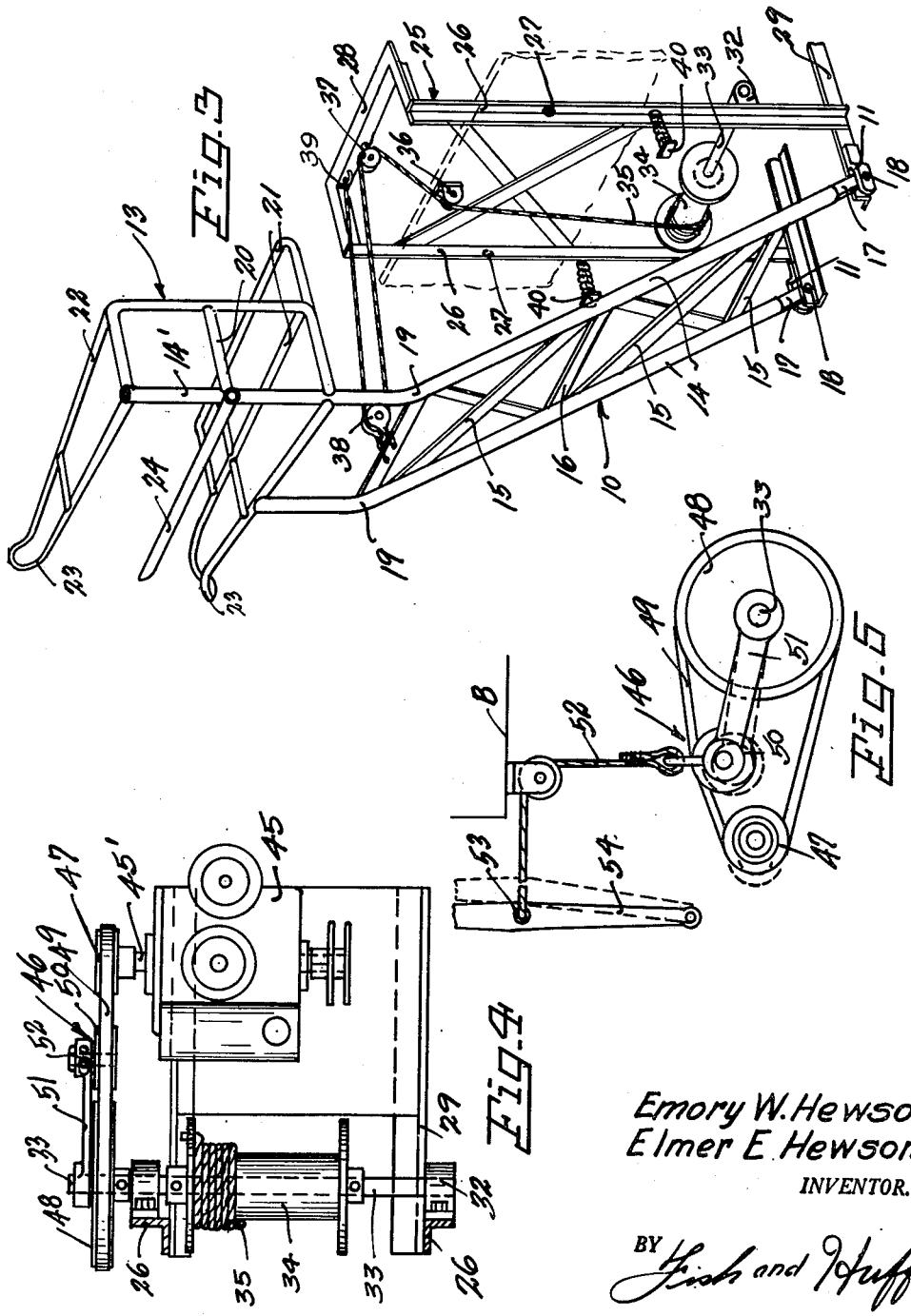
Emory W. Hewson
Elmer E. Hewson
INVENTOR.

United States Patent Office 2,804,219
Patented Aug. 27, 1957

2,804,219

BALED HAY LOADER ATTACHMENT FOR VEHICLES

Emory W. Hewson and Elmer E. Hewson, Rosalia, Wash.

Application December 27, 1954, Serial No. 477,764

2 Claims. (Cl. 214—80)

The present invention is an improved baled hay loader which provides means for individually picking up bales of hay from the ground, elevating them, and discharging them onto a truck.

It has become widespread general practice to cut and bale hay and straw in the field where it is grown. The baling machine travels through the field and bales the crop, the individual bales being dropped along the path of travel. This practice is highly desirable, as it is much more economical to haul the baled hay away from the field than to haul the loose hay to a baling machine, and the baled hay consumes less storage space than loose hay.

The baled hay loader of our invention includes means for detachably connecting it at the side of the truck used to haul the baled hay. The loader travels along with the truck so as to individually pick up the bales, elevate them, and load them onto the truck. A person then stacks them, and when the truck is loaded the loader can readily be detached so that the loaded truck can make the trip out of the field, leaving the loader there for use by a second truck while the first is making its haul.

The invention saves the time and labor which would otherwise be required to manually pick up each bale and lift it up to the height of the truck bed.

Essentially the invention is a vertically tiltable arm detachably pivoted for movements laterally of the flat bed of the truck and adapted to receive, convey, and discharge bales from the ground to the truck bed. The baled hay loader tilting movements are powered by means of a prime mover which is manually controlled so that the arm is moved to its pickup and discharge positions selectively and is provided with sufficient flexibility in positioning so as to accommodate irregularities of the ground surface in the path of travel.

One object of the invention lies in the provision of a baled hay loader which is adapted to pick up bales from the ground and discharge them onto the bed of a truck.

It is presently common to employ endless conveyor type baled hay loaders which are driven by means of ground engaging wheels. This has proven to be unsatisfactory by reason of the irregularities of the ground necessitating an unwarranted construction to permit the ground engaging drive wheels to remain in contact with the surface, and it is therefore an object of this invention to provide a baled hay loader which derives its power from a prime mover carried by the truck, preferably a conventional power takeoff.

Another object of the invention lies in the provision of a baled hay loader which requires power for operation only during the time it is elevating a bale from the ground to be discharged upon the truck bed, thus greatly reducing the wear on the several elements.

Another object of the invention lies in the provision of a baled hay loader which is constructed of a minimum number of parts arranged with facility and which is manually controllable to selectively position the loader as desired.

These and other objects of the invention will become apparent during the course of the following description, and the accompanying drawings wherein a preferred form of the invention is shown. It should be understood, however, that the drawings and description are illustrative only and are not intended to limit the invention except insofar as it is limited by the claims.

In the drawing:

Figure 1 is a view in elevation taken laterally of the normal movement of a truck and showing a portion of the truck bed in cross section with the loader shown by full lines in its discharge position and by broken lines in its pickup position;

Figure 2 is a plan view of the baled hay loader attached to a fragmentary portion of a truck bed;

Figure 3 is a perspective view of our improved baled hay loader;

Figure 4 is a fragmentary plan view of the power means for actuating the loader; and Figure 5 is a diagrammatic view disclosing the manually controlled clutch mechanism forming a part of the power means.

Referring now more particularly to the drawing, it will be seen that the baled hay loader includes a vertically tiltable arm 10 which is pivotally connected at 11 for vertical tilting movements laterally of the truck bed B and normal direction of movement of the truck, as indicated by the arrow 12.

The arm 10 is adapted to pick up and convey bales of hay by means of a scoop 13 which is carried on the outer end of said arm. Close inspection will reveal that the arm 10 consists of a pair of parallel tubular structural members 14 suitably cross braced at 15 for rigidity, and also including transverse brace bars 16 spaced along the length thereof.

At their inner ends, the structural members 14 are provided with apertured extensions 17, which are adapted to receive the pivot pins 18 and thus pivotally support the arm at 11.

Spaced from its outer end, the arm 10 is provided with an obtuse angle bend at 19 for the purpose of disposing the scoop 13 in a horizontal position when the arm is in a substantially horizontal pickup position, as seen by broken lines of Figure 1.

One structural member 14 has an extension 14' which projects beyond the end of the opposed structural member 14, and provides the rear support for scoop 13 which is welded or otherwise secured to the extension 14'. The scoop has a normally vertical back wall 20 and inner and outer side walls 21 and 22. The side walls flare at their forward ends 23 and define a mouth at the forward end of the scoop 13 to receive bales of hay endwise into the scoop.

It will be noted that the inner wall 21 extends above the back wall 20 and the outer wall 22, the purpose of which is to provide a delivery shelf when in the discharge or raised position as will be seen during the course of this description.

Midway the width of the scoop 13, we provide a bale pickup finger 24 which is secured as by welding to the extension 14' and extends forwardly, forming a bottom for the scoop 13 and angles downwardly a slight amount, thus disposing the forward end thereof below the forward ends of walls 21 and 22 for passing under a bale of hay during forward movement of the truck.

A support frame 25 consisting of a pair of support bars 26—26, spaced from each other longitudinally of the truck bed, are secured at 27 to the truck bed B and have their upper ends united by means of a yoke 28 welded or otherwise secured thereto. Their lower ends are supported upon a sub-frame 29 rigidly anchored to the bed B by means of brackets 30 bolted as at 31. Upwardly spaced from their lower ends, the support bars 26 carry axially aligned bearing blocks 32 which journal a cable drum shaft 33 which carries a cable drum 34.

A cable 35 is wound about the cable drum 34 and extends upwardly therefrom over a guide pulley 36 about an idler pulley 37 carried by the yoke 28 of the frame 25 from whence it extends about an idler pulley 38 carried on the outermost brace bar 16 of the arm 10 disposed adjacent to the scoop 13, and then returns to the yoke 25 where it is secured at 39. It is thus to be seen that as the cable 35 is wound upon the drum 34, thereby shortening its length, it causes the arm 10 to tilt vertically about the axis of pivot pins 18, thus raising the scoop 13 from the broken line position of Figure 1 to the full line position thereof. This action therefore conveys a bale contained in the scoop 13 upwardly and deposits it upon the bed B of the truck.

The necessity for the raised inner wall 21 is therefore obvious as means for preventing the bale from falling out of the scoop before the arm 10 reaches its discharge position as shown in full lines of Figure 1.

Since the preponderance of weight is disposed inwardly of the pivot axis defined by the pins 18, when the arm 10 is in the discharge position and the cable is so trained as to exert only upward tilting pressures upon the arm, it is necessary to provide means for imparting to the arm 10 an initial accelerating movement for downward tilting to the pickup position, and we therefore provide spring biased plungers 40 carried by the support bars 26 and disposed to be compressed by the structural members 14 as the arm 10 approaches its discharge position. Upon release of tension upon the cable 35, the plungers 40, exerting outward pressure upon the members 14, pivot the arm 10 outwardly until the balance is moved outwardly of the pivot axis 18, whereupon gravity returns the arm 10 to the pickup position shown by broken lines of Figure 1.

An angled brace bar 41 is rigidly united at 42 to the arm 10 adjacent to its outer end, and extends rearwardly of the truck bed B to a point where it is pivotally supported on a frame 43 carried by the truck bed by means of a pivot pin 44 disposed in axial alignment with the pivot pins 18. It will thus be seen that rearward strains on the arm 10 effected as the truck moves forwardly while the scoop slides over the surface of the ground are supported by the brace bar 41, and yet the arm is adapted for vertical tilting movement about the axis of the pins 18 and 44.

To provide power means for tensioning the cable 35, it is necessary that a prime mover 45 be employed for driving the cable drum 34. We have disposed intermediate the motor 45 and the drum 34 a clutch mechanism indicated in general by the numeral 46. Preferably the prime mover may be an individual power source such as the motor 45 disclosed in the drawing, or a conventional power takeoff of the truck.

When using the motor 45 as indicated, we prefer to employ a belt type transmission which employs a motor pulley 47 and a driven pulley 48, the driven pulley being fixed to the cable drum shaft 33.

A belt 49 is loosely trained about the pulleys and a manually controllable belt tightener idler 50 is pivotally carried on the end of an arm 51 journaled on the cable drum shaft 33. A cable 52 is secured at the outer end of the arm 51, and has its opposed end secured at 53 to a hand lever 54 which may be pivoted at any convenient location as 55 on the truck within reach of the driver in the cab. When it is desired to tauten the cable 35, the lever 54 is moved toward the full line position of Figure 5 wherein the idler 50 tightens the belt 45, thus transmitting the rotary motion of the motor shaft 45' to the cable drum shaft 33 and winding the cable on the drum 34.

When it is desired to lower the arm 10, the lever 54 is released to move to the broken line position of Figure 5, whereupon the belt 49 is loosened and the cable 35 is permitted to freely unwind from the cable drum 34. To prevent the arm 10 from striking the surface of the ground sufficiently hard to damage the baled hay loader, the operator need only apply sufficient tension to the lever 54 to control the downward tilting movement of the arm, thus permitting its removal to the pickup position at a controlled speed.

With the present invention it is possible to pick up bales which are lying in the field in any angular position and even to pick up bales which are tumbled one upon another, since the power for tilting the arm is not dependent upon movement of the truck, and movement of the truck is only required for scooping a bale into the scoop 13. Obviously, this movement may be accurately controlled to pick up bales regardless of how close together they may be, while in conventional conveyor type loaders it is impossible to pick up bales that are not first straightened and placed in position to be accepted by the conveyor so that forward movement may be maintained at all times.

It is also to be noted that with the present invention it is possible and perhaps preferable to use side boards S in connection with the truck bed B, whereupon a much larger load of baled hay may be carried by the truck without its falling off due to rocking movements of the truck while traversing rough terrain. The baled hay loader of our invention lifts the bales high enough to load them onto the bed above the side boards thereof.

Throughout this work we employ the term "baled hay loader" as a generic term for convenience of description and its use is neither intended to limit the scope of the appended claims nor the use of the invention, which may conveniently be employed to load bales of other materials as well as sacked material and other items having physical characteristics making them susceptible to the disclosed operations.

Having thus described our invention, we claim:

1. A baled hay loader comprising in combination with a motor vehicle having a bed, a support frame having parallel elongated vertical support bars secured spaced from each other to the bed longitudinally thereof at one side; a tiltable arm having spaced elongated structural members hingedly carried at the lower ends of said support bars for vertical tilting movement laterally of said bed; and coincident in spacing to said support bars; spring biased plungers carried by said support bars spaced upwardly from their lower ends and extending laterally therefrom to be depressed by said structural members when in the raised position, whereby to impart initial lowering movement to said arm; a scoop on the free end of said arm; said scoop having inner, outer and back walls; the inner one of said walls being of greater dimension than said other walls and constituting a delivery shelf; a bale pickup finger carried by the lower edge of the back wall of said scoop midway its inner and outer walls and extending forwardly at a downward angle, whereby to pass under an article to be picked up; and power means for tilting said arm in upward movements; and selectively releasable to allow downward movement by said plungers and gravity.

2. The invention as defined in claim 1 and further characterized by said scoop comprising inner and outer side walls and a back wall communicating with said side walls at their rear ends; the forward ends of said side walls being flared to define a mouth; a bale pickup finger carried by the lower edge of said back wall midway the inner and outer walls and extending forwardly at a downward angle below the lower edge of said side walls said inner side wall being of greater vertical dimension than said other walls and constituting a delivery shelf.

References Cited in the file of this patent

UNITED STATES PATENTS

| | | |
|---|---|---|
| 934,587 | Wilson | Sept. 21, 1909 |
| 946,028 | Forbess | Jan. 11, 1910 |
| 2,201,088 | Hamon | May 14, 1940 |
| 2,641,370 | Pherson | June 9, 1953 |
| 2,696,924 | Madsen | Dec. 14, 1954 |
| 2,704,164 | David | Mar. 15, 1955 |